Figure 1:
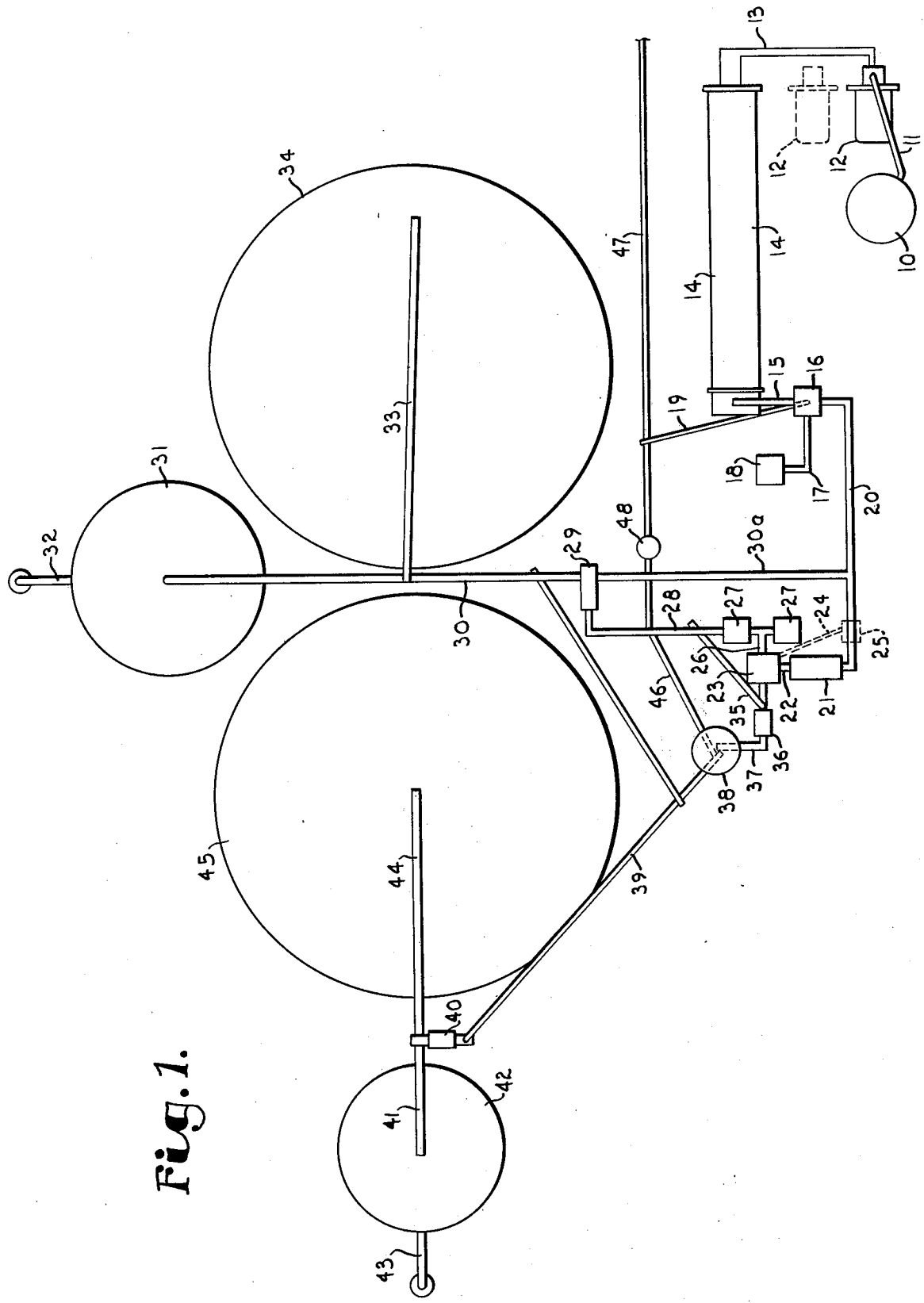

United States Patent [19]
Coghill et al.

[11] 3,888,635
[45] June 10, 1975

[54] AGGLOMERATING SODIUM SULFATE

[75] Inventors: William W. Coghill; William J. Rotramel, both of Tulsa, Okla.

[73] Assignee: Ozark-Mahoning Company, Tulsa, Okla.

[22] Filed: Sept. 26, 1973

[21] Appl. No.: 400,800

[52] U.S. Cl.................................. 23/313; 426/222
[51] Int. Cl............................ B01j 2/12; C01d 5/00
[58] Field of Search.......... 23/313, 302, 300, 301 R, 23/293 R, 293 A; 426/222; 264/117; 423/551, 553

[56] References Cited
UNITED STATES PATENTS

| | | | |
|---|---|---|---|
| 2,374,285 | 4/1945 | Harbough | 23/293 R |
| 2,798,801 | 7/1957 | Kieffer | 23/313 |
| 2,935,387 | 5/1960 | Phillips | 23/313 |
| 2,965,472 | 12/1960 | Huxley | 23/313 |
| 3,497,321 | 2/1970 | Decker | 23/313 |
| 3,516,813 | 6/1970 | Smith | 23/313 |
| 3,620,709 | 11/1971 | Petkovsek | 23/313 |

*Primary Examiner*—Norman Yudkoff
*Assistant Examiner*—S. J. Emery
*Attorney, Agent, or Firm*—Thomas M. Scofield

[57] ABSTRACT

Process and means for producing agglomerated particles of sodium sulfate of a relatively low density and desired size range from denser fines of sodium sulfate comprising: mixing and mulling the fines of sodium sulfate with ten to sixteen percent (preferably twelve to fourteen percent) by weight of water, agglomerating the mixed wetted fines into less dense balls of sodium sulfate while drying same and thereafter segregating optimally sized balls or chunks of agglomerated less dense sodium sulfate for product; the mixing and mulling step effectively carried out in a paired flight mixing screw conveyor having the paired screws thereof rotating in opposite directions; the agglomerating and drying step effectively carried out in an inclined cocurrent rotary dryer without flights at the upper end thereof and feed thereto being at said upper end; the fines of sodium slufate used in the process preferably minus 100 mesh; the sizing means effectively paired, vertically spaced screens with the upper screen of a relatively larger mesh and the lower screen of a relatively finer mesh.

13 Claims, 2 Drawing Figures

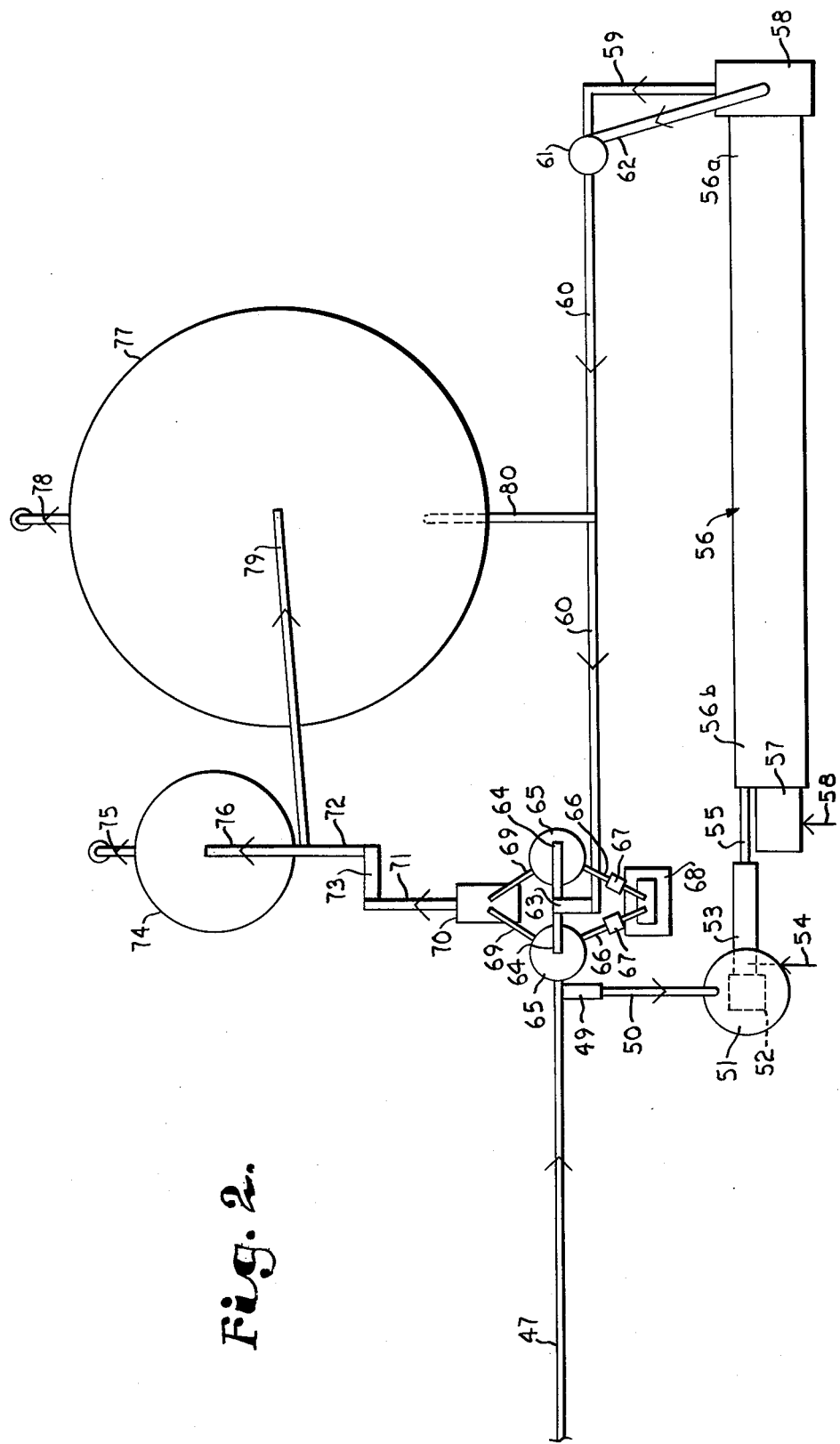

AGGLOMERATING SODIUM SULFATE

OBJECTS OF THE INVENTION

An object of the invention is to provide improved processes, methods and means of producing an improved sodium sulfate particle product.

Another object is to provide methods of and apparatus for consistently building (agglomerating) from dense sodium sulfate fines large enough and strong enough less dense particles which may be attrited or broken consistenly to a desired size in simple equipment.

Another object of the invention is to provide improved means, methods and processes of producing sodium sulfate particles of relatively low density at a desired particle size.

Another object of the invention is to provide means and methods of producing the said improved sodium sulfate particle product by a relatively simple process utilizing relatively simple equipment, the process and apparatus both dependable, with a high yield of the desired product and a minimum recycle of unsuitable product.

Another object of the invention is to produce the desired improved sodium sulfate particle product (of relatively low density and uniform relatively large size) by a process of agglomerating sodium sulfate fines (typically of essentially minus 100 mesh material) resultant from conventional processes of preparing particulate sodium sulfate.

Another object of the invention is to define a method of mixing and mulling sodium sulfate fines with a particular percent of water which will permit an effective, efficient agglomerating and drying step thereof which will result in agglomerated balls or chunks of sodium sulfate of a desired size and lower density than the original fines.

Another object of the invention is to provide improved means and methods of simultaneously agglomerating and drying quantities of mixed wetted sodium sulfate fines in a manner to produce a high yield of a desired low density and relatively large sized sodium sulfate particle product.

Another object of the invention is to provide an integrated, continuous process of producing agglomerated particles of sodium sulfate of relatively low density and in a desired size range wherein fines of sodium sulfate from conventional processes are mixed and mulled with water, thereafter the fines are agglomerated in chunks or balls of the desired size while simultaneously being dried, with the completely dried, agglomerated sodium sulfate particles or balls being passed to a size separating step to isolate the desired product.

Another object of the invention is to provide such a sodium sulfate product particle making process wherein oversize agglomerated material is passed to a comminuting step with the comminuted effluent being recycled to the size separating step.

Another object of the invention is to provide such a process and means therefor wherein sodium sulfate fines and dusts from the drying and agglomerating step may be passed with the agglomerating material to the size separating step for sizing and thereafter return into the agglomerating process.

Another object of the invention is to provide mixing and mulling means for sodium sulfate fines with water comprising a paired flight mixing screw conveyor with the paired screws rotating in opposite directions.

Another object of the invention is to provide improved combined agglomerating and drying means which comprises an inclined cocurrent rotary drier without flights at the upper end thereof whereby to receive feed thereto of mixed and mulled wetted sodium sulfate fines at the said upper end.

Another object of the invention is to provide such a basic sodium sulfate fine agglomerating process and means therefore wherein conventional binding materials may readily be added to the materials to be or being agglomerated to produce a product having a minimum friability.

Other and further objects of the invention will appear in the course of the following description thereof.

Referring to the drawings, which form a part of the instant specification and are to be read in conjunction therewith, schematic flow diagrams of two stages in the improved process are shown.

FIG. 1 is a schematic flow diagram (from above) of substantially conventional drying, moving, processing and storing means for handling anhydrous sodium sulfate as produced from natural deposits. There are shown (to be described) points and steps in the conventional said aparatus and process from which sodium sulfate fines to be used in the improved agglomerating and particle production process may be taken.

FIG. 2 is a schematic flow diagram shown from above of an improved process of producing agglomerated particles of sodium sulfate of relatively low density and in a desired relatively large size range.

BASIC PROCESS DESCRIPTION (FIG. 1)

Reference is made to the article entitled "The Production of Sodium Sulphate from Natural Brines at Monahans, Tex.," authored by W. I. Weisman, and R. C. Anderson, appearing in Mining Engineering, July, 1953. This article sets out in detail processes for the manufacture of anhydrous sodium sulphate or salt cake from natural deposits in the United States wherein steps for exploiting natural brine reservoirs are elaborated producing a high grade of salt cake qualifying for nearly all desired uses. The finished product, very white, passes a 10-mesh U.S. standard screen, and is retained in a 200-mesh U.S. standard screen. It is over 99% sodium sulphate with main impurities being sodium chloride and magnesium sulphate. Iron content is less than 0.01%.

The process described in the article involves two principle steps. The first is to cool the brine to crystallize out glauber's salt, which is 56% water and 44% sodium sulphate. The second step is to melt the glauber's salt, evaporate the water of hydration and dry to anhydrous sodium sulphate.

The drying plant, where the water of crystallization is removed from the glauber's salt, has been described in detail (C. O. Anderson and E. W. Douglass: Submerged Combustion As Applied to Sodium Sulphate Production; Chemical and Metallurgical Engineering; May, 1941).

While the feed to the apparatus employed to produce the desired, specified product may come from any source (provided it meets certain specifications, to be set out below), there will be first described substantially conventional drying, processing and storage means from which the feed to the instant improved process to produce the desired improved product may be drawn or provided. The drying process is picked up in the flow sheet comprising the first sheet of drawings immediately after the submerged combustion evaporators.

FIG. I DESCRIPTION

In the submerged combustion evaporators, a gaseous fuel is burned beneath the surface of the liquid, in this case the solution of sodium sulphate, with the products of combustion bubbling up through the solution. The burner is submerged at sufficient depth to assure complete and efficient transfer of heat from the products of combustion to the solution. About 70% of the total water load is evaporated in the submerged combustion units with a dilute slurry of 4 to 5% precipitated solids drawn continuously from the evaporators to settling tank 10. From settling tank 10, the slurry is passed through line 11 into centrifuge 12 (or filter) which reduces the moisture content of the salt to 4 or 5% for drying. Overflows from settling tank 10 and centrifuge 12 are typically returned (not shown) to the submerged combustion evaporators except for portions therefrom (also not shown) typically used to dissolve glauber's salt at a point prior to introduction of solution to the evaporators.

The effluent from centrifuge or filters 12 is passed via transfer line 13 to rotary kiln 14 where the balance of the water is driven off. Air duct 15 from kiln 14 passes to cyclone dust collector 16 to which exhausting fan 18 is connected by line 17. The fine dust from cyclone 16 (essentially — 100 mesh) is passed via line 19 to the feed line to the improved process, to be described. The coarser material from the kiln 14 is passed via screw conveyor (not seen) into elevator 21. This latter material is in the size range of —20 +200 mesh and density of 67 to 75 pounds per cubic foot.

From elevator 21 via line 22, the coarse material is passed to trommel screen 23. From trommel screen 23 via line 24, the larger material retained on the screen is passed back to hammermill 25 overlying line 20. After processing by the hammermill, the recycled material is passed again via line 20 to elevator 21 and thence to screen 23. This is a small recycle of, say, +10 mesh material.

The smaller material passing through screen 23 is passed via line 26 to magnetic separators 27 for despecking of the sodium sulphate. The effluent from separators 27 is passed via line 28 to elevator 29. Elevator 29 feeds conveyor 30 leading to loading tank 31 having loading spout 32. A second conveyor 33 leads from conveyor 30 to surge storage tank 34. Means (not shown) to retrieve material from surge storage tank 34 and pass same either directly to loading tank 31 or to conveyor 30. Alternatively, loading means can be provided from surge storage tank 34. Conveyor 30 has a portion 30a thereof which may be employed to bypass trommel screen 23 and despecking operations under certain conditions. Ordinarily, however, this is not used.

Ordinarily, approximately one-half of the total production coming from line 20 (say 200 tons per day) is removed from line 28 through line 35 and passed to elevator 36 by conventional means such as a gate drop. From elevator 36, line 37 passes to air separator 38. The coarse material effluent from air separator 38 is passed via line 39 to elevator 40. Line 41 from elevator 40 passes to loading tank 42 having loading spout 43, any surge or additional material thereover going via line 44 to surge storage tank 45. Again, the retrieval means from tank 45 to loading tank 42 are not shown and, if tank 45 is supplied with a loading spout, loading could be accomplished from tank 45. The purpose of air separator 38 is to de-dust the product in line 37. The finer material, typically representing 25% or less of the input to air separator 38 is taken off through line 46 and thereafter passed through line or conveyor 47 to the improved process to be described below, resulting in the improved product. It should be noted that line 47 is joined by line 19 from cyclone dust collector 16. A micropulverizer 48 may be provided above line 47 anywhere along the length thereof to be fed, optionally, by material from line 28 or line 20. This would provide, then, additional makeup feed to line 47 of the same character of the materials received therewithin from lines 46 and 19.

Assuming the output from rotary dryer 14 in line 20 to be approximately 200 tons per day, then substantially 200 tons would be passed via line 28 from separators 27. If 100 tons per day is passed via line 37 to air separator 38, then 100 tons per day would arrive at elevator 29 to go to tanks 31 and 34. With 100 tons per day passing to air separator 38, if 85 tons per day is passed from the air separator into line 39, then 15 tons per day of fines would pass into line 46 to line 47. The fines from cyclone dust collector 16 passed through line 19 into line 47 could reach up to 30 tons per day, for an overall total of 45 tons per day feed to the system to be described hereafter.

If additional feed of the character described to line 47 is required, a feasible source of same from the system just described is to take "fines" from trommel screen 23 to the micropulverizer 48. In this case, it is not necessary to pass the said fines through the magnetic means 27 for despecking as there is a despecking magnet in the later circuit to be described. It might be commented that despecking is solely for asthetic reasons and affects the purity of the materials by less than 1/1000th percent. Thus, in processing a quantity of 200 tons of sodium sulphate per day perhaps some 5 lbs. per day of magnetic material would be recovered therefrom.

It should be understood that the material in line 47 is not a generally recognized commercial entity at the instant writing, sold as a product itself, per se. It comprises essentially —100 mesh material. Further, micropulverizer 48 is not fed by line 47, merely being shown positioned thereover to feed thereto after receiving materials for pulverizing from trommel screen 23, line 20 or the like.

Now referring to the second sheet of drawings and FIG. 2 thereof, the input to the system is from line 47. All the fines in line 47 pass into elevator 49, passing therefrom through line 50 to surge tank 51 having a cone bottom to which is attached vibrating feeder or other conventional discharge mechanism 52. This measures the feed into a paired flight mixing screw 53 which operates both as a conveyor and muller. Water, in measured quantities, is added at the input end of screw conveyor 53 through line 54. This is in the amount of 10 to 16% by weight, preferably in the range of 12 to 14% by weight (of the sodium sulphate). At this point various binders may be added if desired. The paired screws within screw conveyor 53 rotate in opposite directions to one another. Other mixers and mullers may be used but the said described device provides a continuous feed of uniformly mixed material, uniformly wetted, therefrom.

The discharge from apparatus 53 is into dryer feed conveyor 55. The effluent from conveyor 55 passes into the upper end of cocurrent rotary dryer 56 having fire box 57 to which gas is input through line 58. Rotary dryer 56 slopes towards its discharge end at 56a. As a specific example of a suitable rotary dryer construction, we employ a cylindrical dryer 28 feet long, four feet in diameter, rotating at 5 r.p.m.. The dryer has a slope of one-half inch to 1 foot. These dimensions not intended to be limiting.

The moistened material in dryer feed conveyor 55 is substantially at the interface between states describable as pasty and crumbly. This material is not extruded from conveyor 55.

It is desirable to agglomerate balls or chunks of moistened sodium sulphate in rotary dryer 56. Accordingly, the upper one-half 56b of rotary dryer 56 (that part receiving the discharge from conveyor 55) has no flights therewithin. In this non-flighted section the moist $Na_2SO_4$ rolls and balls into chunks or pellets approximately one-half of drying takes place here also. On the other hand, the lower one-half (56a) of rotary dryer 56 has standard conventional radially directed flights therewithin whereby to complete the drying function of dryer 56. Accordingly, there is simultaneously provided in a single piece of apparatus, first, an agglomerating function and, secondly, a drying function.

The total quantity of water within the agglomerated balls or chunks of sodium sulphate is entirely removed in the cocurrent rotary dryer. That is, the aforementioned 10 to 16 (12 to 14) percent water is lowered so that the effluent pellets from the dryer into the dust box 58 have no moisture content. The size of the pellets issuing from portion 56a of rotary dryer 56 is largely in the range of 10 mesh up to three-eighths inch. The minor portion is between 10 and 100 mesh. If the pellet is larger, it will not dry adequately.

The effluent sodium sulphate pellets are removed through line 59, passing to line 60 after cyclone dust collector 61. Line 62 carries dust from dust box 58 to cyclone dust collector 61. Line 60, thereafter, carries the pellets and the fines as well as the dust to elevator 63.

From elevator 63, lines 64 pass to a pair of stacked (double deck) screens 65, typically horizontal, circular vibrating screens, the upper screen coarse and the lower screen fine. Depending upon the product to be removed from each screen, the following are typical screen sizes. The upper screen is typically 10 mesh to 20, while the lower screen may range from 20 mesh to 60 mesh. Screens 65 are identical sets of paired screens in parallel. The sizing thereof depends on the desired specification.

Coarse material retained on top of the upper screen is passed via line 66 across plate magnet 67 which removes both coarse and fine magnetic material, if any, thereafter passing to any typical conventional comminuting mill equipment 68. Such may involve rollers, knives or be a conventional hammermill, such as an Allis Chalmers granulating mill. At 68, the oversize chunks are broken to the desired size with a minimum amount of undersize. The entire granulator output, then, by a line not shown, is recycled to elevator 63 and screens 65.

On size material which is received on top of the lower screens at 65 comprises the desired product and is passed via lines 69 over despecking magnetic separator 70. This product material is passed to storage via suitable lines 71 and 72 through elevator 73. At 74 is seen a loading tank having a loading spout 75 served by line 76. Surge storage tank 77 is shown as having loading spout 78 and being served by line 79.

The undersized material which passes through the lower screens at 65 is removed by line or lines (not shown) to elevator 49 and line 50 input to tank 51 to recycle for rewetting and reagglomeration, thereafter to return to storage through the process just described as products of the desired character and size. Line 80 is a recycle line from the surge storage tank should some product deteriorate over a considerable period of time and require recycling and reprocessing in the process described.

The amount of water added in muller 53 is critical in the range noted as, when the material supplied to the rotary dryer 56 is too wet, it sticks to the dryer in too large clumps. In the event same is too dry, it will not ball to the desired product as described.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described the invention we now claim:

1. A process of producing agglomerated particles of sodium sulfate of relatively low density in a desired size range comprising the steps of:

continuously passing quantities of relatively dense minus 100 mesh sodium sulfate fines into a mixing and mulling step with the addition thereto of 10 to 16 percent by weight of water, continuously passing the mixed and mulled, wetted fines from the latter step to a simultaneous agglomerating and drying step, agglomerating in said latter step balls or chunks of less dense sodium sulfate in a size range of +10 mesh to −100 mesh and simultaneously drying the water from same, the agglomerating and drying step carried out in a single inclined rotary dryer without flights at the upper end thereof with the feed of mixed and mulled wetted fines thereto being at said upper end, thereafter passing the completely dried, agglomerated sodium sulfate balls from said drying and agglomerating step to a size separating step, and, separating oversize and undersize material from the desired product in said size separating step.

2. A process as in claim 1 including the step of passing oversize material from said size separating step to a comminuting step and recycling the comminuted effluent therefrom to the said size separating step.

3. A process as in claim 1 wherein the water is added in the range of 12 to 14 percent by weight of the sodium sulfate.

4. A process as in claim 1 wherein fines and dust from said drying and agglomerating step are passed with the agglomerated material to said size separating step.

5. A process as in claim 1 including the step of recycling undersized material from the size separating step to the mixing and mulling step.

6. A process as in claim 1 including passing product material from the sizing step to storage and thereafter recycling product from storage to the input to the size separating step.

7. A process as in claim 1 wherein the mixing and mulling step is carried out in a paired flight mixing screw conveyor with the paired screws rotating in opposite directions.

8. A process of producing agglomerated sodium sulfate balls or chunks of relatively low density and in a limited desired size range comprising the steps of:
feeding $-100$ mesh dense sodum sulfate fines in continuous quantities into a mixing and mulling means with addition thereto of water in the quantity of ten to sixteen percent by weight of the sodium sulfate,
discharging uniformly mixed and wetted fines from the mixing and mulling means into a simultaneous agglomerating and drying means,
said agglomerating and drying means comprising a single inclined cocurrent rotary dryer without flights at the upper end thereof, the discharge thereinto being at the upper flightless end thereof, forming within said latter means less dense balls of sodium sulfate in a size range of $+10$ mesh to $-100$ mesh, while simultaneously drying out the moisture therefrom,
thereafter passing the completely dried, agglomerated sodium sulfate particles or balls to a size separating means,
the size separating means comprising an upper screen of more open mesh and a lower screen of less open mesh,
separately removing oversized material (that retained on top of the upper screen) and undersized material (which passes through the lower screen) from the system,
and separately removing as on size product material that retained on top of the lower screen.

9. A process as in claim 8 wherein fines and dust from the agglomerating means are passed with the agglomerated sodium sulfate balls and chunks to the size separating means.

10. A process as in claim 8 wherein the oversized materials from the size separating step are passed to a comminuting means and thereafter recycled to the size separating means.

11. A process as in claim 8 including passing undersized materials from the size separating means to the mixing and mulling means.

12. A process as in claim 6 including passing the on size product material to a storage step and thereafter recycling a portion of said stored product to the sizing means.

13. A process as in claim 8 wherein the water is added in the mixing and mulling step in the range of 12 to 14 percent by weight of the sodium sulfate.

* * * * *